Nov. 10, 1970

WATARU MAYEDA 3,538,621

TEACHING APPARATUS

Filed Nov. 16, 1967

INVENTOR.
WATARU MAYEDA
BY
Bacon & Thomas
ATTORNEYS

INVENTOR
WATARU MAYEDA
BY Bacon & Thomas
ATTORNEYS

Nov. 10, 1970

WATARU MAYEDA 3,538,621

TEACHING APPARATUS

Filed Nov. 16, 1967

INVENTOR.
WATARU MAYEDA
BY
Bacon & Thomas
ATTORNEYS

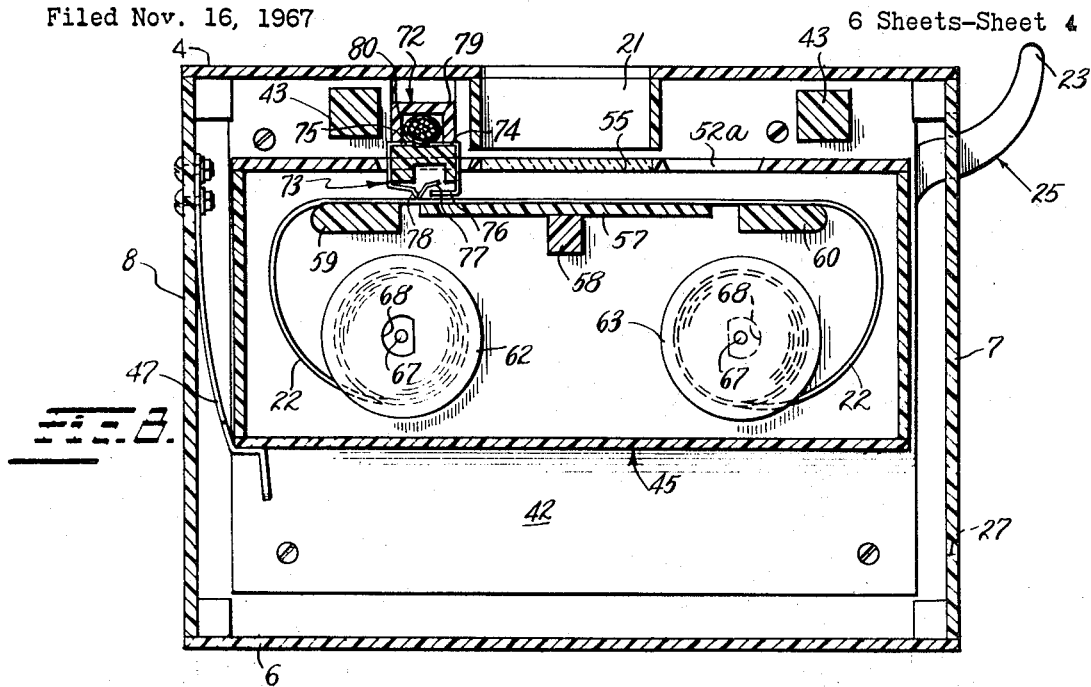
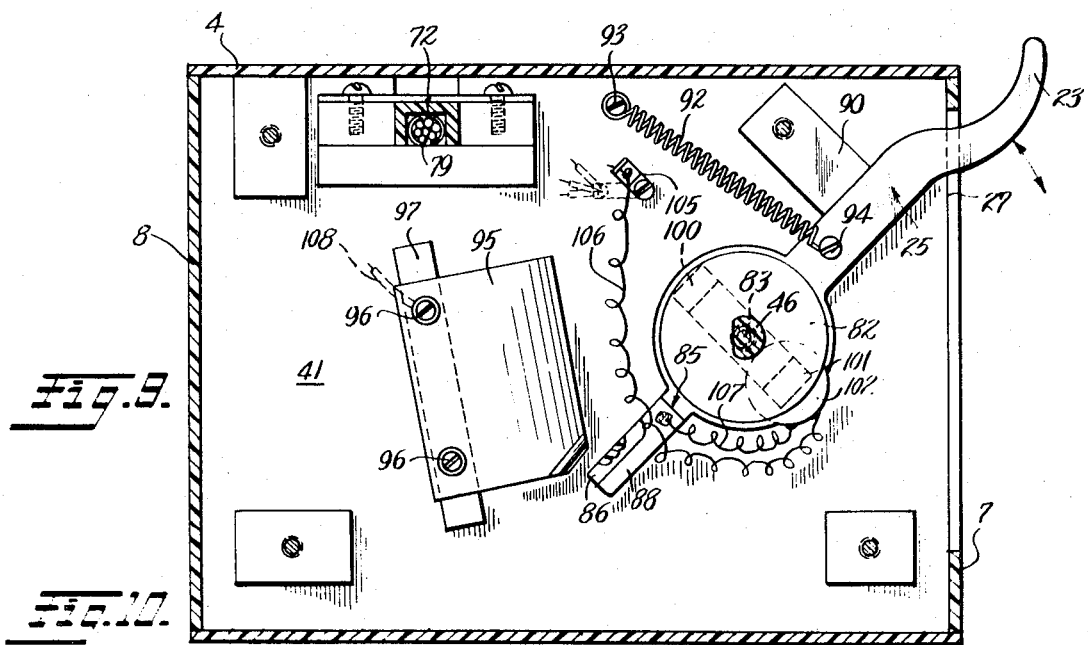
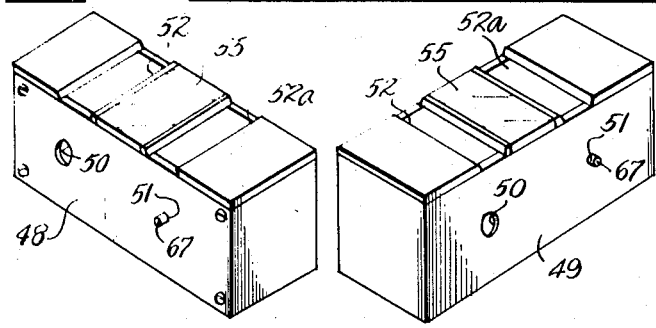

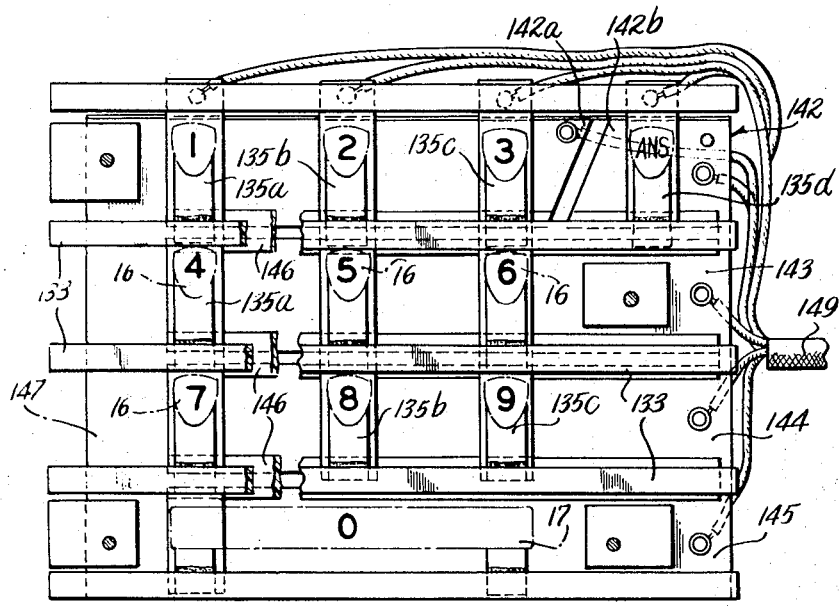

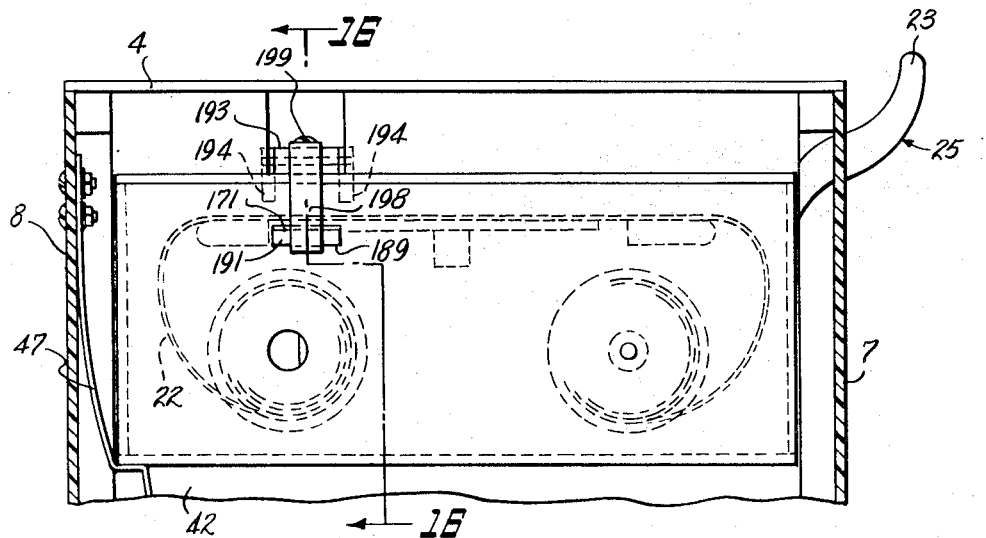
Fig. 15.
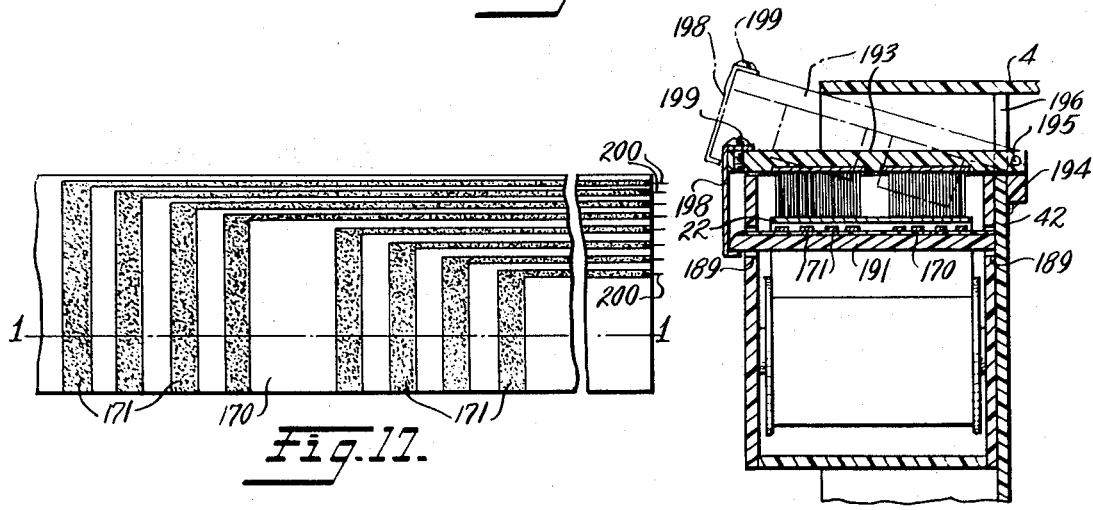
Fig. 17.
Fig. 16.
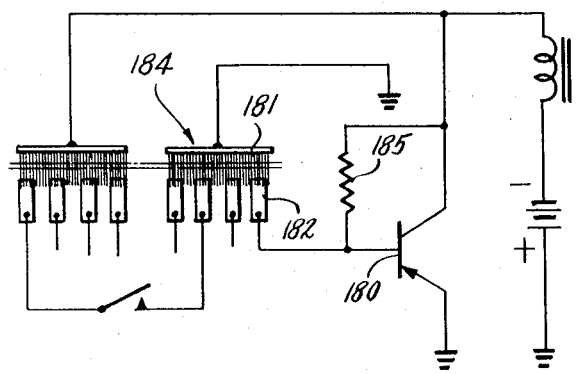
Fig. 18.
INVENTOR.
WATARU MAYEDA
BY Bacon & Thomas
ATTORNEYS United States Patent Office 3,538,621
Patented Nov. 10, 1970

3,538,621
TEACHING APPARATUS
Wataru Mayeda, 1106 S. Western,
Champaign, Ill. 61820
Filed Nov. 16, 1967, Ser. No. 683,664
Int. Cl. G09b 3/02
U.S. Cl. 35—9
6 Claims

ABSTRACT OF THE DISCLOSURE

A teaching apparatus comprising a tape and driving means including a manually operated lever for moving the tape past a display station, said tape being imprinted with problems and answers for display and having circuit conditioning means in the form of punched holes operable at a control station to successively condition predetermined electrical circuits to the driving means for completion by closure of switches; and a keyboard, each key of which closes one of said switches. Masking means conceal portions of the tape containing the answers until operation of the proper key energizes the driving means whereby operation of the lever causes the tape to advance from a first position wherein the problem is displayed to a new position wherein both the problem and answer are displayed. The keys must be operated in proper sequence to cause the movement of the tape through the machine and correctly set forth the answer to the problem.

FIELD OF INVENTION

The present invention relates to an improved teaching apparatus or teaching aid for presenting information to a student and including means for the student to respond to the information. For example, a machine designed in accordance with the present invention might provide a visual display of information, in the form of an arithmetic problem, to the student and include a machine input mechanism, such as an arrangement of numbered keys, upon which the student can respond to the problem by sequential manipulation of the keys corresponding to the numerals in the answer. The machine may be further designed so that manipulation of the proper keys will result in a visual display of the correct answer and manipulation of any other keys will not alter the original display.

SUMMARY OF THE INVENTION

The following description relates particularly to a machine for teaching which includes a movable tape for the visual display of problems and answers such as arithmetic problems; as well as an arrangement of operator keys corresponding to numerals or other identifying indicia. The machine further includes a key designated as the answer key and a manually operated tape advance lever. The machine tape is wound on a pair of rollers, confined within a removable magazine, which are adapted to be selectively rotated by the tape advance lever when a magnetic clutch is energized in order to advance the tape along a path through a display window in response to the operation of the tape advance lever and the proper keys, if necessary. A control station located adjacent to the tape includes a plurality of switches conditioned by signal means on the tape to partially complete or preset electrical circuits between a battery or some other suitable power source and the magnetic clutch coil. The preset circuits are then completed by operation of predetermined keys whereby the magnetic clutch will be energized and the tape advance lever activated. Operation of the answer key will always complete a separate electrical circuit to energize the clutch coil and activate the tape advance lever without regard to the state of the preset circuits.

When the tape rollers are initially placed within the magazine the operator can depress the tape advance lever and drive the tape to a first position where a problem is displayed but the answer to the problem is masked by the machine cover. In this first position the signal means on the tape will deenergize the magnetic clutch coil and condition the switches at the control station which correspond to the key of the first numeral of the correct answer. If after viewing the problem the student responds by depressing the key corresponding to the first numeral of the correct answer the magnetic clutch will be reenergized and the tape may be advanced to a second position by manual operation of the tape advance lever. On the other hand, if the student responds by depressing the incorrect key, the tape advance lever will be ineffectual to change the position of the tape. When the tape is moved to the second position, the first digit of the answer will be oriented in the display window along with the problem and at the same time another signal means on the tape will condition the electrical circuit corresponding to the key of the second digit of the correct answer. The student may then respond by depressing a key corresponding to the second digit of the answer and moving the tape advance lever to display the second digit. The above cycle may then be repeated until the complete answer is on display. After the tape has been placed in the final answer position for a particular problem, or in the event the student wishes at any time to move on to another problem, he may depress the answer key and operate the tape advance lever to move the tape to the first position of the next problem on the tape.

The moveable tape is sufficiently wide for the imprint of two sets of problems and answers, each set occupying one half the width of the tape. One set of problems is therefore printed in inverted position with respect to the other and the tape roller magazine is made reversible so that the tape may run through the machine in a first direction to display the first set of problems, after which the magazine may be reversed and the tape run through the machine in the opposite direction to display the second set of problems without rewinding.

BRIEF DESCRIPTION OF THE DRAWINGS

FIG. 8 is a vertical sectional view taken on the line 8—8 of FIG. 6.

FIG. 9 is a vertical sectional view taken on the line 9—9 of FIG. 6.

FIG. 10 is a perspective view showing one side of the reversible tape cartridge.

FIG. 11 is a perspective view of the opposite side of the reversible tape cartridge of FIG. 10.

FIG. 12 is a horizontal sectional view taken on the line 12—12 of FIG. 4 showing the contact bars, with the outline of the operating keys shown in phantom lines for purposes of clarity.

FIG. 13 is a schematic wiring diagram of the teaching apparatus.

FIG. 15 is a vertical sectional view corresponding to FIG. 8 but showing the construction of an alternative embodiment of the invention.

FIG. 16 is a vertical sectional view taken along the lines 16—16 of FIG. 15.

FIG. 17 is an enlarged horizontal view showing a printed circuit board used with an alternative embodiment of the control switch.

FIG. 18 is a partial schematic diagram of an electrical circuit which may be utilized with the alternative control switch.

DESCRIPTION OF THE PREFERRED EMBODIMENT

Figure 1:
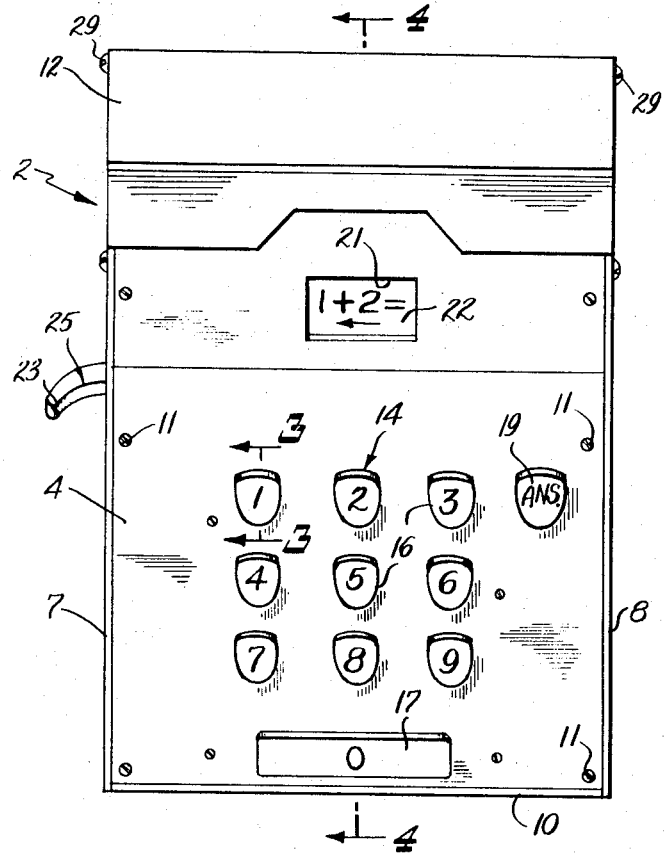
FIG. 1 is a plan view of the teaching apparatus of the present invention.
Figure 2:
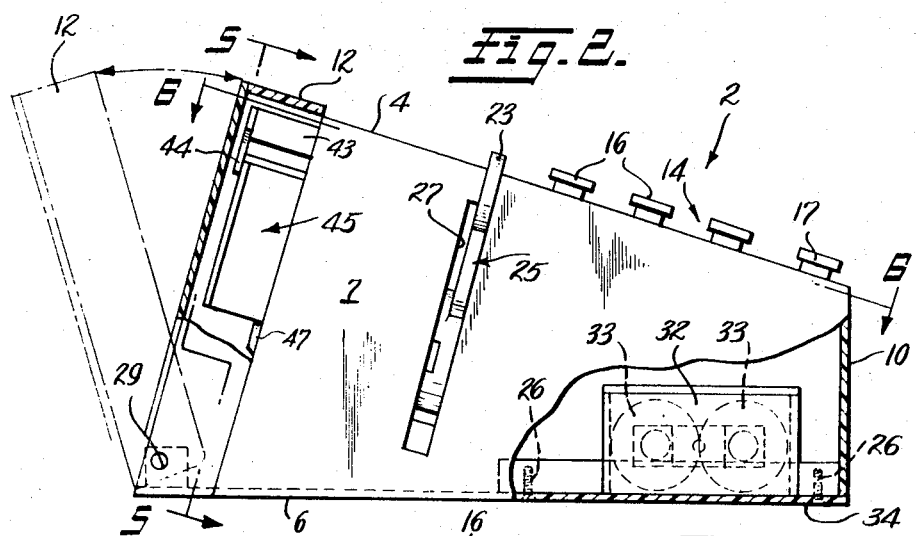
FIG. 2 is a side elevational view of the apparatus partly in cross-section, as viewed from the left of FIG. 1.

Referring to FIGS. 1–12, numeral 2 generally represents the cabinet of the teaching apparatus described. As seen in FIGS. 1 and 2, the cabinet is comprised of a top 4, bottom 6, sides 7, 8, and an end 10, as well as a removable end cover 12, all comprised of plastic or other similar material and assembled by means of suitable fasteners such as screws 11. The top of the cabinet is provided with a keyboard 14 comprising a plurality of keys 16 and a bar 17, each having a numeral or other identifying indicia thereon, along with a key 19 designated as the answer key. Preferably the keys 16 and bar 17 correspond in number and identification to the numerals 0–9 as the machine is adapted for use as an arithmetic teaching apparatus. However, it should be apparent that the machine could as well be adapted to teach some other types of information, such as spelling, in which case the number of keys would correspond to the keyboard of a standard typewriter or the input of any other program controlled machine. Each key, when depressed, closes as switch as will be described in more detail later in particular conjunction with FIGS. 12 and 13.

Figure 6:
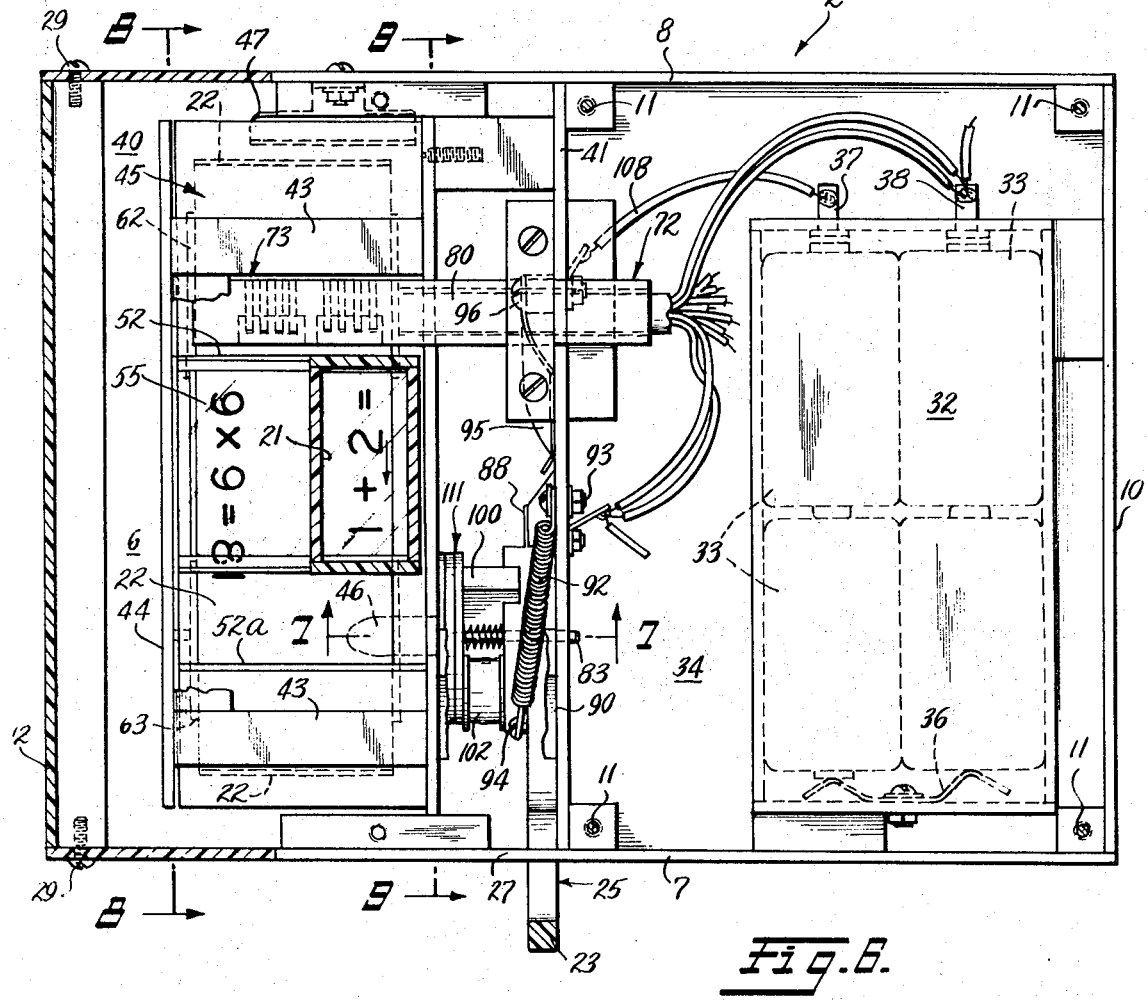
FIG. 6 is an enlarged horizontal sectional view taken on the line 6—6 of FIG. 2.

In FIG. 2 a portion of the cabinet side is cut away to expose an end view of a battery box 32 and batteries 33 which comprise the power source for the apparatus. As shown, a portion 34 of the cabinet bottom may be removed by unfastening screws 26 in order to replace the batteries. FIG. 6 shows in a dotted outline the manner in which the batteries are confined in closed cicuit relationship between a spring clip retainer 36 and terminals 37, 38 to which the electrical circuits of the apparatus are connected in a manner to be described. It should be apparent that any other suitable source of power could be used in place of the batteries shown. Rearwardly of the keyboard 14 the cabinet is provided with a display window 21 through which the tape 22 is visible, while on the left side of the cabinet the handle 23 of a tape advance lever 25 protrudes from a slot 27 in the cabinet side 7. As shown in FIG. 2 the removable end cover 12 may be pivoted about fasteners 29 in the cabinet side in order to permit free access to a compartment 40 defined within the cabinet directly beneath the display window 21.

Figure 4:
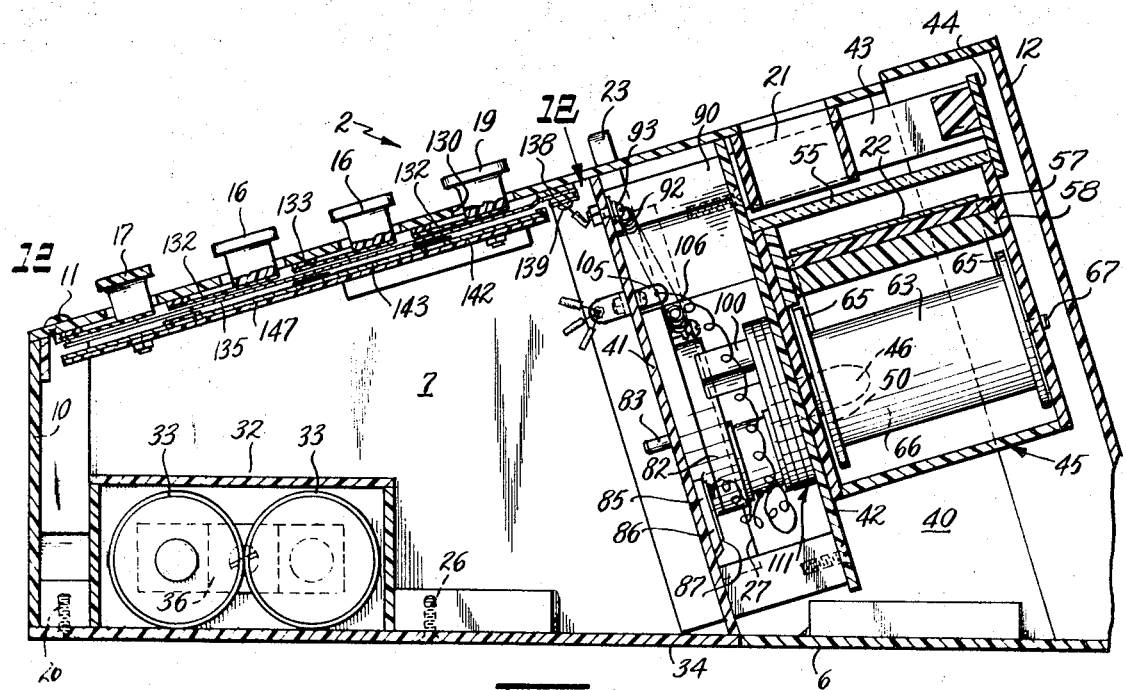
FIG. 4 is an enlarged fragmentary vertical sectional view taken on line 4—4 of FIG. 1.
Figure 5:
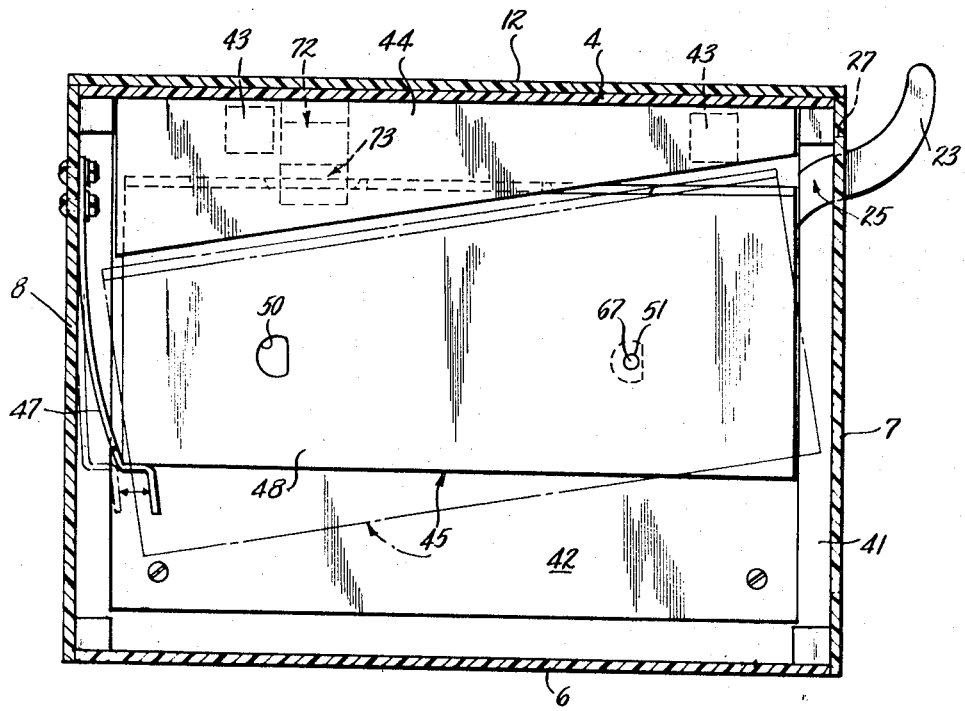
FIG. 5 is an enlarged vertical sectional view taken on the line 5—5 of FIG. 2 showing the holding means for the tape magazine and the method of removing the tape magazine from the teaching apparatus.

Referring now to FIGS. 4 and 5 the inside of the cabinet is subdivided by walls 41 and 42, with one side of the compartment 40 being defined by wall 42 generally extending between the top and bottom of the cabinet and the other side by a tapered half wall 44 mounted outwardly from wall 42 on suitable supports 43. The compartment is adapted to receive a removable tape magazine 45, normally mounted in a horizontal position behind tapered half wall 44 with one end supported by a driving pin 46 extending through a hole 50 in the side of the magazine and the other end supported by a spring retainer 47 which clips beneath the magazine. When in this horizontal position the tapered wall 44 acts to prevent the magazine from moving laterally away from the driving pin as the tape advance lever is operated. In order to remove the magazine the end of retainer 47 may be manually forced back against the cabinet wall and the magazine pivoted downwardly, as shown in FIG. 5, so that it clears the tapered wall 44 and can be slipped off the pin 46.

The reversible magazine is shown in FIGS. 10 and 11 to comprise two side walls 48, 49 which are identical with the exception that wall 48 is removably fastened to the magazine by screws to afford access to the interior thereof. As shown, each side of the magazine includes a small hole 51 in addition to the larger hole 50 adapted to receive pin 46.

The top of the magazine includes two slots or openings 52, 52a and has a transparent cover 55 of glass or plastic fixed between said openings. As shown in FIGS. 4 and 8, a tape support 57 is mounted on a block 58 fastened within the interior of the magazine to the fixed wall 49 of the magazine, and is flanked on either side by a pair of tape guides 59, 60 also mounted on the fixed wall of the magazine. As shown, the tape guides have contoured edges and are aligned with the tape support so that the tape 22 will slide freely over the entire assembly. The interior of the magazine is also adapted to confine a pair of spools 62, 63 extending between the sides thereof; with each spool including two flange-like ends 65, a hollow center roller 66, and a short pin 67, fixed in the center of a first one of the ends, which is designed to fit through the corresponding small hole 51 in one of the magazine side walls in order to anchor the spool in fixed but freely rotatable relationship within the magazine.

The second end of each spool is formed with a hole 68 in its center to receive the driving pin 46. As shown in FIG. 9 the driving pin 46 is generally cylindrical but has a portion removed to form a flat side on the pin. The receiving hole 68 in the spool end has the same cross-sectional shape as driving pin 46 whereby the pin, when extended into the magazine and spool will turn freely in round hole 50 in the magazine side wall but will mate with the hole 68 in the spool end so that the pin and the spool turn together in driving relationship.

The tape magazine is adapted to be reversed in the apparatus by mounting one of the tape spools in reversed relationship to the other. In view of this construction, either identical side of the tape magazine may be presented to receive the driving pin 46 which is attached to and controlled by the magnetic clutch and tape advance lever in a manner to be further explained. Thus, viewing FIG. 8 the anchor pin 67 of the right hand spool extends through the magazine side wall nearest the observer and the receiving hole 68 is aligned with hole 50 in the magazine wall away from the observer so as to receive the driving pin 46. At this time the anchor pin of the left hand spool extends through hole 51 in the magazine side away from the observer and receiving hole 68 is aligned with corresponding hole 50 in the magazine wall nearest the observer.

In using the apparatus a roll of tape 22 displaying the desired information is wound on the two spool rollers and the spools are placed in the magazine with the tape extending over the tape guides and support as shown in FIG. 8, after which the removable side of the magazine is replaced. It should be apparent that the tape then will be visible through the transparent cover 55 located at the top of the magazine as the tape is transferred from one roller over the tape guides and support to the other roller by rotation of the roller associated with the driving pin.

The roll of tape is fabricated of a suitable non-conductive substance such as paper or plastic and has visual information printed thereon, for example in the form of mathematic problems and answers. This visual information will be successively exposed to view in the display area of the apparatus as the right hand roller is rotated in a clockwise direction as viewed in FIG. 8, for example. In addition to the visual information the tape carries circuit conditioning information which may be in the form of punched holes 70 or any other suitable means. The punched holes are oriented in eight columns spaced across the width of the tape which correspond to eight switches located in the control station 72. The punched holes in any column are selectively spaced along the length of the tape in order to sequentially condition the particular switch corresponding to that column.

The tape is made sufficiently wide for the display of two sets of problems and answers; each set being printed on one half of the width of the tape. Thus, one set of problems is printed in inverted position with respect to the other so that the tape may be run through the machine in a first direction to view the first set of problems; after which the magazine may be reversed and the tape run through the machine in the opposite direction to view the second set of problems without previous rewinding. It should also be apparent that many different tapes may be used with the apparatus of the present invention, each tape being imprinted with different sets of problems and answers. Naturally the spacing of the holes punched in each tape will be selected to provide the proper position control of the tape as it is displayed.

As shown in FIGS. 6 and 8 the control station is fastened to wall 41 and includes a switch mounting 73 which extends into the top of the compartment 40 and is oriented so that it fits through one of the slots 52 into the interior of the tape magazine when the magazine is placed in the compartment, whereby the switches located in the bottom of the switch mounting will be located adjacent to the tape.

FIG. 6 shows eight switches arranged across the width of the tape which are aligned with and correspond, respectively, to the eight columns of punched holes in the tape.

As seen in FIG. 8, each switch comprises a right terminal 74 and a left terminal 75. A contact 76 is associated with the right terminal, while a contact 77 and spring detent 78 are associated with the left terminal. The terminals and contacts of each switch are connected in a separate electrical circuit with a corresponding key on the keyboard by means of a plurality of conductors 79 passing through a hollow housing 80 at the top of the control station. In the normal switch position the detent 78 will contact the tape and thereby hold contacts 76, 77 open. However, as the tape moves by the control station, the detent 78 of each switch will eventually drop into a hole in the tape in the column aligned with that switch. Thus each time a detent drops into a hole in the tape the contacts 76, 77, of that switch will be permitted to close and thereby condition or preset the electrical circuit associated with that particular switch. When the contacts of a switch are in such a closed position the depression of the key corresponding to that switch will energize the coil of a magnetic clutch and enable the operator to rotate driving pin 46 and move the tape by operating the tape advance lever in a manner to be explained.

Referring now to FIGS. 4 and 9 the driving means comprise the tape advance lever 25 and magnetic clutch arranged in the cabinet between walls 41 and 42, along with the driving pin 46 extending through a suitable opening in wall 42 to engage the tape magazine and spool. The tape advance lever 25 also may be fabricated of plastic and comprises an operating handle 23 protruding from a slot 27, shown to be conveniently curved to accommodate the operator's hand. The lever further includes a thick center portion 82 and pivot pin 83 one end of which rotates freely in the base of pin 46 and the other end of which fits through a hole in wall 41 and establishes an axis of rotation for the lever about the pin. A switch end 85 of the lever is formed opposite the operating handle, said end having a beveled edge 86 and a portion 88 plated plated with conductive material. A stop block 90 fastened to wall 41 defines the limit of counterclockwise rotation of the lever and the bottom of slot 27 cooperates with a return tension spring 92 fastened between screw 93 in wall 42 and screw 94 in the lever handle to define the limit of clockwise rotation. A plate 95 of conductive material is fastened slightly away from wall 41 by screws 96 passing through an insulating block 97. The lower edge of plate 95 is slightly curled away from the wall 41 so that the beveled edge of switch end 85 will pass beneath the conductive plate and describe an upwards arc in contact with the inner side of the plate as the operating handle of lever 25 is depressed. The lever 25 is designed to have an angle of movement just sufficient to permit switch end 85 to separate from the upper edge of the conductive plate when the handle 23 is completely depressed. Furthermore, the upper edge of the conductive plate 95 is curled slightly inward to rest against the wall 41 so that as the switch end 85 clears the plate it will override the plate and return in a downwards arc in contact with the outer surface of the conductive plate. Thus, it should be apparent that electrical contact is established between the conductive portion 88 of the lever and the plate 95 during the upwards arc of the switch end 85 but no electrical contact is established on the return arc.

As best seen in FIGS. 4 and 6 the thick center portion 82 of the lever supports a U-shaped element of metallic material having ends 100, 101 which form field poles for a magnetic clutch. The field pole 101 is surrounded by an insulated electrical coil 102. Referring momentarily to FIG. 9 an electrical circuit may be traced from terminal 105, through flexible conductor 106, through the coil 102 and on through flexible conductor 107 fastened to the conductive portion 88. When the portion 88 of the lever contacts the conductive plate 95 the circuit is completed through conductor 108 attached to the plate 95 and ultimately on through the control circuits to a power source for the coil.

Figure 7:
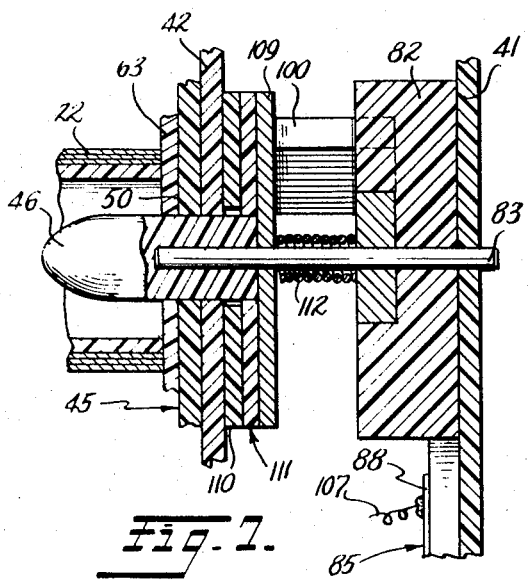
FIG. 7 is an enlarged fragmentary vertical sectional view taken on the line 7—7 of FIG. 6 showing the magnetic clutch arrangement for intermittently advancing the tape.

Referring now to FIG. 7 the driving pin 46 is fixed to a circular metallic disc 109 which forms part of a clutch plate 111 and will be held by magnetic force in fixed relationship to poles 100, 101 and therefore to the lever 25 when coil 102 is energized. Consequently, each time the clutch coil is energized the operation of lever 25 will cause the magnetically composite assembly of poles, clutch plate and driving pin to rotate and drive the spool. However, when the coil is not energized the disc 109 will be slightly away from the magnetic poles by compression spring 112 and the insulating panel 110 of the clutch plate will be forced into light frictional engagement with wall 42 in order to maintain the driving pin and spool in a stationary position. Under this condition the pivot pin 83 will maintain the alignment of the driving pin, clutch plate and lever, but will turn freely in the base of the driving pin as the lever moves in either direction. It should now be apparent that the spool may only be driven, in the direction dictated, on the downward stroke of lever 25 under conditions where coil 102 is energized. Consequently, as power is fed to the coil through the control circuits the lever 25 will follow a cycle akin to ratchet operation; turning the spool on the downward stroke but having no effect on the return stroke since at that time the coil power circuit is broken between conductive plate 95 and the conductive portion 88 of the lever.

Figure 3:
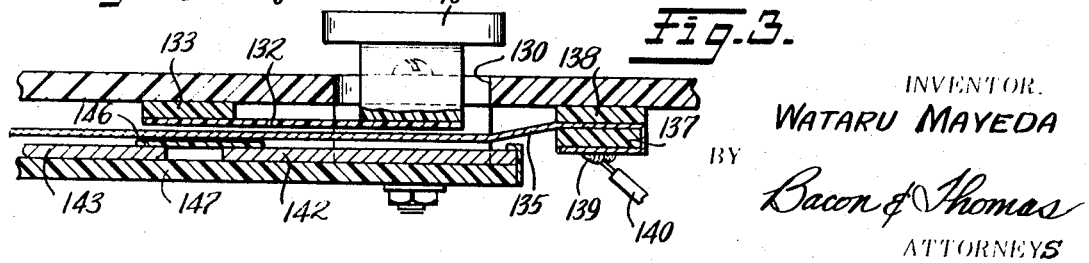
FIG. 3 is an enlarged fragmentary vertical sectional view taken on line 3—3 of FIG. 1 showing the details of construction through one of the operating keys.

The mechanical operation of the keyboard may be most easily considered with FIGS. 3 and 12. FIG. 3 shows a detailed cross-section of one key wherein it is apparent that the key is mounted in a hole 130 in the cabinet top and fastened to a resilient plastic strip 132 which is in turn fixed to a block 133 mounted on the underside of the cabinet. The resiliency of the plastic strip is sufficient to return the key to its normal position after it has been depressed. A strip 135 of conductive material is located immediately beneath the key and the manner in which the end of the strip is wrapped around block 137 and fastened to the insulating block 138 on the underside of the keyboard to form a connecting terminal 139 for conductor 140 should be particularly noted. The strip 135 extends from the top of the keyboard to the bottom of the keyboard and is secured at the latter point by a connection identical to that described above. Underlying the key and strip 135 is another conductive strip 142 which runs from the left side of the keyboard to the right side and is supported by an insulating board 147 forming the bottom of the keyboard assembly. The ends of the conductive strip 142 are also adapted to be connected to an electrical conductor, not shown, in the manner described above. It should be apparent that depression of the key will force conductive strip 135 into electrical contact with conductive strip 142 and thereby complete a circuit between the conductors connected to the respective strips. A second conductive strip 143 is shown which would be oriented under and operated upon by another key on the keyboard. It is of particular interest that the conductive strips 142, 143 are bridged by an insulating member 146. This member prevents electrical contact between the conductive strips at any point other than directly beneath a depressed key.

Turning now to FIG. 12 the entire keyboard arrangement is shown. Thus strips 135a–d are shown corresponding, respectively, to the columns of keys, and strips 142–145 are shown corresponding, respectively, to the rows of keys whereby a matrix of conductive strips is formed. It should be noted that strips 135b and 135c are cut off on the bottom end so that depression of the O bar will complete a connection only between strips 135a and 145. Likewise strip 135d spans only the width of strip 142; which is broken into two sections 142a and 142b whereby an isolated contact is provided for the "ANS" key. The various keys and supporting plastic strips 132 are shown in dotted outline overlying the keyboard while the insulating members 146 are shown extending between the strips 142–145 and insulating board 147 is shown in dotted outline beneath the assembly of conductive strips. A separate conductor is shown connected to each conductive strip, including a conductor for each of segments 142a and 142b; and the plurality of conductors are gathered into a flexible cable 149 connected to the control station, not shown.

The operation of the apparatus may best be understood in conjunction with the schematic diagram of FIG. 13 in which the various elements are designated by numerals consistent with those used in the other figures. The control station is shown in dotted outline supporting the eight switches over tape 22. The top four switches, designated 151–154, are shown in normally open position and have one side connected in common to terminal 155. The next four switches, 156–159 are also shown in normally open position and have one side connected in common to terminal 160. In addition to a normally open contact, switch 159 is shown to have a pair of normally closed contacts $R_p$, $R_t$. Thus when the detent associated with switch 159 drops into a hole in the tape the normally open contacts of the switch will close and contacts $R_p$, $R_t$ will open. In a like manner the contacts of any of the other switches will close only when the detent for that switch drops into a hole in the tape.

When terminals $R_p$, $R_t$ are closed a circuit may be traced from the positive terminal of the battery through $R_p$, $R_t$, terminal 162, terminal 155, clutch coil 102, on through conductive plate 95 to ground. Consequently the tape may be advanced by moving the lever 25 until a hole passes beneath the detent of switch 159. It should now be apparent that the holes in the bottom column of the tape cooperate with terminals $R_p$, $R_t$ of switch 159 to define the problem display and answer display positions of the tape in the apparatus.

A circuit may also be traced from the positive terminal of the battery through terminals 160, 164 along line 165 to the answer key and returning along line 166 to terminal 162 and then on through the clutch coil to ground. This circuit will always act as an override control and will enable the energization of the clutch coil each time the answer key is depressed, thereby permitting the operator to advance the tape at will without regard to the display positions defined by the switch conditioning means.

The remaining function of the apparatus may now easily be understood if it is assumed that a freshly loaded tape magazine is inserted in the apparatus and the operating handle is depressed until the first problem is visible in the display window. At this point a hole will appear under the detent of switch 159 opening contacts $R_p$, $R_t$ and breaking the circuit to coil 102 to stop the tape regardless of any continued movement of the operating handle. Assuming the displayed problem is the addition problem 1+2, for example, punched holes would also be oriented under the detents of switches 154 and 156, respectively. The contacts of both these switches would therefore be closed to preset an electrical circuit including the key designated 3. Consequently should the operator respond with the correct answer to the problem by depressing that key and then operating the handle of the tape advance lever the clutch coil would be energized and the tape would be moved to a second position wherein the problem and answer are displayed as 1+2=3. Notice that after the tape moves a small amount the holes therein are moved past the detents of all the switches 154, 156 and 159. Consequently, contacts $R_p$, $R_t$ will close and movement of the tape will be transferred back to the electrical circuit maintained through those contacts. As a result of this the tape will continue to move until a second hole appears under switch 159 to again open contacts $R_p$, $R_t$. Naturally this hole is properly oriented to determine the display situation set forth above. It should be obvious that with the circuits preset to only the 3 key, depression of any other key will be ineffectual to energize the clutch coil. Therefore, the operator will be apprised that an incorrect response was made to the problem.

Likewise it should be apparent that, in order to require a complete response to a problem having a multidigit answer, a tape position must be defined for each digit of the answer. However, this poses no real problem in that it simply requires the proper placement of punched holes or other conditioning means on the tape in order to establish the desired display positions. In operating the apparatus to give a multidigit answer the operator would depress the first key, move the tape to display the first digit of the answer, then depress the second key and so on until the entire answer is unmasked.

It should also be noted that the tape must necessarily have a set of holes to control movement in either direction. Again the fact that the holes are oriented across the full width of the tape presents no difficulty since the set of columns of holes for one direction may be offset from the set of columns of holes for the second direction so that the holes for the switch having contacts $R_p$ and $R_t$ will not interfere. Also, though the present embodiment utilizes punched holes as circuit conditioning means, any other conditioning means such as magnetic dots or magnetically recorded information could be used as well.

Figure 14:
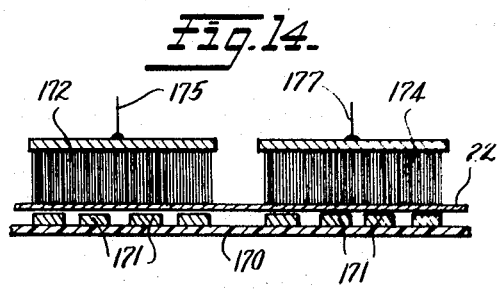
FIG. 14 is a vertical section of an alternative embodiment of the control switch of the teaching apparatus.

FIGS. 14–18 show an alternative embodiment of the control switch arrangement which may be used with the present invention. This control switch is shown in FIG. 14 to generally comprise a supporting board of insulating material 170 upon which eight columns or strips 171 of conductive material are deposited to form a printed circuit type switch. Above this assembly two sets of flexible metal brushes 172, 174 are shown electrically connected, respectively, to conductors 175, 177. The metal brushes would normally contact strips 171 and complete an electrical circuit therebetween except that tape 22, shown in cross-section, is oriented between the brushes and conductive strips and acts as an insulator. However, it should be apparent that, as the tape is moved so that a punched hole is oriented in the control switch, a number of filaments of the appropriate metal brush will pass through the hole into contact with the conductive strip under that hole to complete an electrical circuit therebetween.

It should also be noted that the switches formed by the brushes and contacts shown in FIG. 14 are normally open. However, in the event it is desirable to utilize a normally closed switch in this embodiment of the invention, that may be easily accomplished by employing a transistor or some other switching element in conjunction with the desired "normally closed" circuit. Thus FIG. 18 shows a partial schematic diagram for one such circuit. It should be apparent that the transistor 180 is operated as a switching element and will be normally conductive. However, in the event that a circuit is completed between brushes 181 and contact 182 of switch 184, a bias voltage will be applied to the base of the transistor through resistor 185 in order to switch the transistor to a nonconductive state. It should be apparent that such a normally closed switch could be utilized in place of normally closed contacts $R_p$, $R_t$ of switch 159 in the preferred embodiment or alternatively in place of any or all of the normally open contacts of the key controlled switches. Naturally, in the case of the key controlled circuits the appropriate key would be connected between the battery and the biasing resistor whereby depression of the key would energize the transistor biasing circuit.

FIGS. 15 and 16 disclose the structure of the alternative switch arrangement, cabinet and magazine of the present invention. In the alternative embodiment the half wall 44 is not utilized and each side of the magazine is provided with a pair of additional holes or slots 189 to accommodate the alternative switch structure. Thus, a modified control station is mounted in the same general location as in the primary embodiment; being comprised of a lower member 191 fastened to wall 42 and an upper member 193 extending through an opening 196 in wall 42 so as to be pivotally fastened to the inner surface of its wall by means of blocks 194 and pin 195. The lower member serves as a base to which the insulating board 170 and conductive strips 171 are affixed, for example, by a suitable adhesive. As shown, the composite assembly of member 191, board 170 and strips 171 is adapted to fit through the slots 189 in each side of the magazine. Since the half wall 44 is not present the magazine may be slipped directly over pin 46 and member 191; with the slots 189 being located so that the conductive strips 171 will be oriented below tape 22 in an opening between the tape guide and tape support structure of the magazine.

As shown, the outer end of member 193 is capable of vertical movement through an angle of approximately 30 degrees, being limited in an upward direction by contact with the top of the cabinet and limited in a downward direction by contact with the top of the magazine when it is in place. The flexible metal brushes which comprise the other switch contact elements are fastened in depending relationship from the upper member 193, again by any suitable means. Consequently, if the member 193 is raised the flexible brushes will also be raised whereby the magazine may be inserted or removed from its operative position in the cabinet. When the magazine is in place member 193 can be lowered whereby the metal brushes will pass through the slot 52 in the magazine top and rest in contact with the upper surface of tape 22. The outer end of member 193 carries a metallic clip or fastener 198 affixed thereto by screw 199. When member 193 is lowered into a horizontal position the clip may be moved into engagement with the bottom of member 191 in order to retain the magazine and switch elements in fixed relationship. Consequently the clip 198 assumes the function of the removed wall 44 in preventing the tape magazine from disengaging from the driving pin 46 as the advance lever is operated.

FIG. 17 shows an enlarged fragmentary plan view of the conductive strips 171 laid on insulating board 170 in the form of a printed circuit. As shown, the strips are electrically isolated, with each strip having a separate conductor and terminal 200 at the base of member 191 to which the key circuits may be connected in a suitable manner, not shown. The brushes will selectively engage the strips 171 along line 1—1 and it may be observed that the conductive strips are sufficiently wide at that point so that each strip will engage a number of strands of the metallic brushes in order to provide good electrical contact. The conductive terminals of the metallic brushes are connected in electrical circuit with the control keys in the same relationship employed in the principal embodiment of the invention by suitable connectors not shown.

It should be understood, of course, that the foregoing disclosure relates to only the preferred embodiment of the invention and that numerous modifications or alterations may be made therein.

I claim:
1. A teaching apparatus comprising: a cabinet having selectively operable keys; a compartment in said cabinet adapted to hold a supply of record material; means in said cabinet for the display of said record material; driving means for sequentially advancing said record material in steps along a path by said display means; said driving means including a drive train and a magnetic clutch in said drive train; and control means in electrical circuit with said keys for energizing said magnetic clutch to condition said driving means for actuation.

2. Apparatus as defined in claim 1 wherein said record material comprises a roll of tape; and said driving means includes a manually operable member adapted to selectively rotate one of a pair of rollers upon which said tape is carried through said magnetic clutch.

3. Apparatus as defined in claim 2 wherein said roll of tape is provided with means cooperable with said control means for predetermining, at each step of advancement, which keys of said keyboard must be actuated to produce the next step.

4. Apparatus as defined in claim 3 wherein said control means comprises a plurality of switching means oriented over said tape and designed to switch from a first state to a second state in response to said predetermined means.

5. Apparatus as defined in claim 4 wherein said plurality of switching means comprise an arrangement of flexible metallic brushes adapted to pass through holes in said tape to electrically engage conductive strips mounted on an insulating board.

6. Teaching apparatus comprising: record means having bits of information recorded thereon in predetermined sequence; display station means; driving means, including a drive train having a magnetic clutch therein, for intermittently moving said record means along a predetermined path to make said bits of information available at said display station; a plurality of circuit means for energizing said magnetic clutch; control means corresponding to recorded information on said record means for completing a portion of certain of said circuit means; and a keyboard having a plurality of keys each of which, when activated, completes another portion of certain of said circuit means whereby actuation of only that one key corresponding to a particular bit of recorded information will cause the energization of said magnetic clutch to permit moving said record means.

References Cited
UNITED STATES PATENTS

| 2,030,175 | 2/1936 | Le Fevre | 35—9 |
| 3,096,592 | 7/1963 | Schuster | 35—9 |
| 3,191,315 | 6/1965 | Hannah | 35—9 |
| 3,212,199 | 10/1965 | Clark | 35—9 |
| 3,228,118 | 1/1966 | Hirtle | 35—9 |
| 3,246,402 | 4/1966 | Diamond | 35—9 |
| 3,252,229 | 5/1966 | Van Ostrom | 35—9 |
| 3,386,187 | 6/1968 | Kilby | 35—9 |
| 3,392,460 | 7/1968 | Schure et al. | 35—9 |
| 3,408,749 | 11/1968 | Brudner | 35—9 |

WILLIAM H. GRIEB, Primary Examiner

U.S. Cl. X.R.

35—6